April 19, 1938.  G. SLAYTER  2,114,546
ACOUSTICAL MATERIAL
Filed Feb. 7, 1936
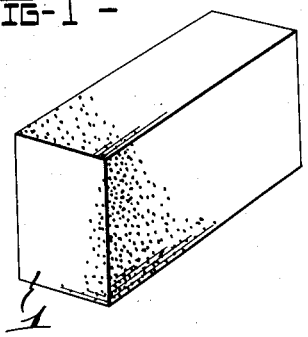
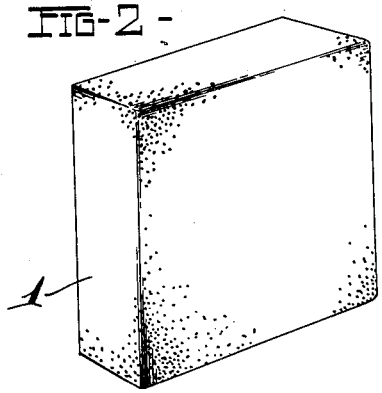
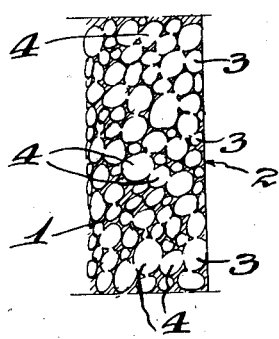
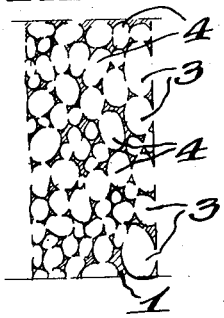
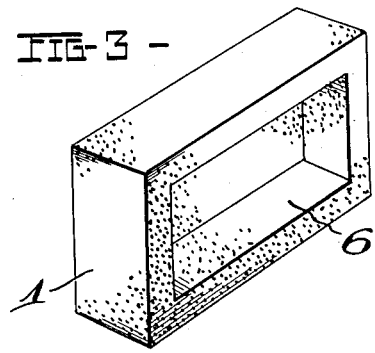
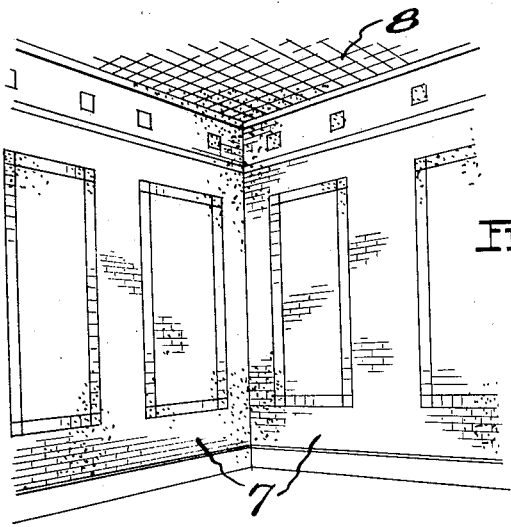
James Slayter
INVENTOR.
BY Rule & Hoge
ATTORNEYS.

Patented Apr. 19, 1938

2,114,546

UNITED STATES PATENT OFFICE 2,114,546

ACOUSTICAL MATERIAL

Games Slayter, Newark, Ohio, assignor to Owens-Illinois Glass Company, a corporation of Ohio Application February 7, 1936, Serial No. 62,781

5 Claims. (Cl. 72—18)

The present invention relates to an acoustical material and also to a method of its preparation.

It is an object of the present invention to provide a porous material capable of absorbing and deadening sound waves.

It is another object of the present invention to provide a light weight acoustical material having sufficient structural strength and having a convenient form for handling so that it may be built up and incorporated in the walls of a room.

A further object of the present invention is to provide a method of opening up the pores lying in proximity of the surface of a glass foam block or the like in order to permit access to the atmosphere.

It is also within the contemplation of the invention to provide a structural acoustical material which may be built up in various shapes and in a variety of colors so as to present a pleasing and decorative pattern.

Other objects and advantages of the present invention will become apparent from the following description taken in conjunction with the drawing, in which:

Figs. 1 to 3 are perspective views of porous vitreous blocks of different shapes, consisting of glass foam or the like;

Fig. 4 is a diagrammatic view of a conventional glass foam block in which the surface has not been treated in accordance with the present invention;

Fig. 5 is a diagrammatic view of a glass foam block in which the surface pores have been opened to the atmosphere; and Fig. 6 is a perspective view of the interior walls of a room which have been lined with my acoustical material.

Broadly, the present invention contemplates providing a porous block of vitreous material such as glass foam or the like in which the pores lying near the surface of the block have been opened up to permit the pulsations of sound waves to enter and be absorbed therein.

In producing a porous vitreous block adapted for acoustical purposes, glass foam may be obtained by developing a very seedy or foamy glass and expanding it in a mold to the desired size and shape. In order to accentuate the size of the seeds or internal cavities, a gob of glass may be placed in a mold cavity larger than the gob of glass itself and then the mold may be evacuated to permit the internal pressure within the seeds and the surface pressure of the dissolved gases within the gob of glass, to bloat the gob and fill out the mold. A multiplicity of enlarged pores interconnected with one another may thus be produced.

The sound waves which exist in an ordinary room are in general, advancing alternate compression and rarefied air surfaces. When an advancing compression or rarefied wave surface strikes a flat reflecting wall, the elasticity of the air permits the waves to rebound and be reflected with substantially the same force or volume and in the same arrangement to produce what is known as an "echo". If the surface of the wall is undulating or irregular, the alternate compression and rarefied waves will not tend to rebound in the same formation in which they reached the wall surface. The undulations, however, must be of sufficient depth, preferably greater than the wave length of the sound itself, in order to break up the original formation of the sound waves. In other words, mere irregularity per se in a wall surface does not assure absorption or destruction of the sound waves.

If the formation of the wall surface is such that it presents surface pores which lead into relatively deep, circuitous and irregular internal chambers, the advancing sound waves will be admitted through the pores to the enlarged cavities embedded in the surface where the compression and rarefied waves may be mutually confined and dissipated.

The present invention contemplates a vitreous material in which the surface pores lead into internal pores or cavities and these pores or cavities, in turn, lead into other irregularly placed pores or cavities, and so on through the material in more or less random fashion. The sound waves are permitted to travel through the successive pores or cavities and are deadened in their journey. In providing such an acoustical material, I have found that glass foam is ideally suitable, particularly when the foam is composed of a great many intercommunicating cells.

Fig. 4 shows a conventional glass foam block 1 which, when it is produced in a mold, has a surface skin or enamel 2 which closes up the surface pores 3 so as to present a relatively smooth and uniform surface to the atmosphere. I propose to remove the said surface skin or enamel 2 by means hereinafter more fully disclosed so as to leave the surface pores 3 free and open to the atmosphere where they may receive the advancing sound waves. The surface pores 3 open into a multiplicity of internal pores 4, at least a part of which are interconnected. When the sound waves reach the surface of the block, a portion of the wave is admitted into the internal pores via the surface pores, and in their travel they are pocketed in these pores, whereby they are absorbed and deadened. In this manner, my new acoustic material effectively silences an advancing sound wave.

I shall now describe several methods of removing the surface skin or enamel to open up the internal cells or cavities. The initial glass foam block is preferably made in substantially the same size as the desired finished acoustical block. The surface enamel may then be removed by means of a sand blast. The blast will be directed against the surface 2 so as to break through the outer enamel and expose the surface pores or cavities 3 to the atmosphere. The enamel surface 2 may also be removed by means of a blast of heat which will melt down the surface 2 at the thin portions surrounding the pores 3 to expose the latter to the atmosphere and permit ready access for the sound waves.

Other methods may present themselves to those skilled in the art, as, for example, polishing, abrading, grinding, cutting or the like. The present invention also contemplates forming a glass foam block of double or more thicknesses and then cutting the glass foam block into sections to present the newly formed inner surfaces to the atmosphere. These inner surfaces will have their pores open to form the acoustical surface. In order to give the block strength and to make it strain free, the glass foam block should be annealed.

Blocks of varying sizes and design may be fabricated in accordance with any decorative pattern which may be desired. Examples of these are presented in Figs. 1, 2 and 3. In the first two of these views, rectilinear-shaped blocks are shown. These are preferably from about one to four inches in thickness to provide an acoustical block of sufficient depth to absorb substantially all sound waves of varying wave lengths. Fig. 3 is an open block having a cavity 6 formed therein which is capable of providing additional undulations and which may be formed to present a desired decorative pattern.

Fig. 6 illustrates the manner in which my acoustical blocks may be applied to the surface of a wall. It is to be observed that the blocks are light weight, porous and may be built up not only along the vertical walls 7 but also the ceiling 8 in a manner which is pleasing to the eye. In building up a wall surface, these blocks are laid adjacent one another in the same manner as the conventional bricks and may be secured in place by means of a suitable cement or mortar. It is to be noted that an acoustical wall surface, made up of my acoustical blocks, does not require a covering or finishing but may be exposed bare to the atmosphere.

Although the present invention has been illustrated and described in connection with specific embodiments, it is to be understood that variations and modifications may be made within the scope and spirit of the appended claims.

I claim:

1. An acoustical material which comprises a body of glass having a multiplicity of gas filled pores dispersed therein, at least a portion of said pores having access to an exposed surface of said body, said surface presenting a multiplicity of closely spaced pore openings.

2. An acoustical material which comprises a glass foam block having a multiplicity of enlarged seeds dispersed therethrough, at least a portion of the seeds which lie in proximity to one surface of said block being open to the atmosphere at said surface and providing a multiplicity of closely spaced openings in and distributed over said surface.

3. An acoustical material which comprises a glass foam block having a multiplicity of enlarged seeds dispersed therethrough, at least a portion of the seeds which lie in proximity to one surface of said block being open to the atmosphere and providing a multiplicity of closely spaced openings in and distributed over said surface, the major portion of the seeds in the block having intercommunication with adjacent seeds.

4. An acoustic wall surface comprising a plurality of porous glass foam blocks, each of said blocks having at least a portion of the pores thereof opened outwardly to the atmosphere and presenting an exposed surface having a multiplicity of closely spaced pore openings distributed over said surface.

5. The lining of a room which comprises a plurality of porous glass foam blocks adapted to absorb and deaden sound waves, said blocks being built up into a predetermined pattern and having at least a portion of the pores within the individual blocks intercommunicating with each other and with the said room, said blocks presenting an exposed surface having a multiplicity of closely spaced pore openings distributed over said surface.

GAMES SLAYTER.